Figure 1:
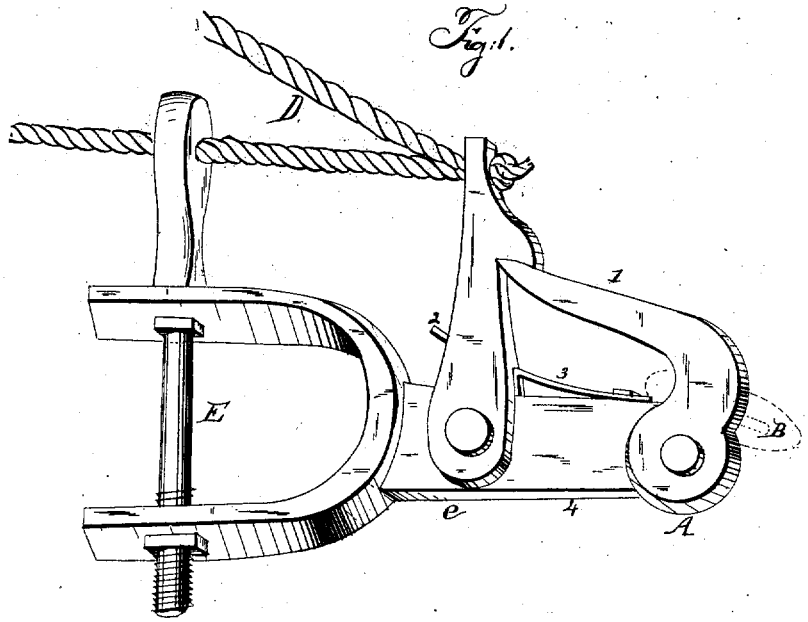
Figure 2:
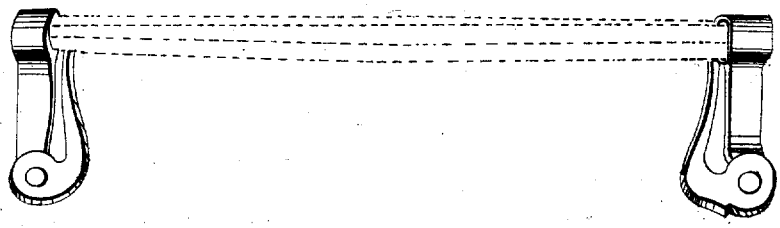

9088X

G. SHULTZ.

Detaching Horses.

Patented Sept 9, 1835.

N. PETERS, PHOTO-LITHOGRAPHER, WASHINGTON, D. C.

9088X Sept 9 1835 ar 12 177

Gotlieb Sheltz

Letters Patent

The schedule referred to in these Letters Patent and making part of the same, containing a description in the words of the said Gotlieb Shultz himself of his improvement in a machine in the navigation of canals and disengaging horses from vehicles when they run off.

The hook or machine is composed of four pieces of iron or other metal as seen in the accompanying draft and numbered from 1 to 4 inclusive. No 1 This piece moves on pivot A, carrying the ring B. to which the tow line is fastened and is prevented by the catch No 2 from opening. No 2 the catch which is fastened by means of pivot C, to the bottom of the piece No 4 and is kept in its place by spring No 3 which is also fastened to No 4) by pulling line D, which is fastened to the catch and which the driver must have at command, the hook is opened and the horse detached from the tow line No 4. the lower piece to which the others are attached, this piece is fastened to the swingletree by the screw and nut E. It may also be applyed to swingle trees of carriages as seen in plate marked (no 2,) by affixing it to both ends of the swingletree, Witnesses
Joseph L. Thomas
Jas. Goodman Goltz Shultz E+?
Ch[illegible]

240. [illegible]

(Drawing)

(Patented September 9. 1835)